United States Patent [19]

Gross et al.

[11] Patent Number: 4,915,456

[45] Date of Patent: Apr. 10, 1990

[54] COMPACT, INTEGRATED, MULTI-FUNCTION BRAKE VALVE

[75] Inventors: Dario Gross, Corunna; Richard D. Hetfield, Owosso; Jeffery S. Johnston, Haslett, all of Mich.

[73] Assignee: Midland Brake, Inc., Owosso, Mich.

[21] Appl. No.: 346,086

[22] Filed: May 2, 1989

[51] Int. Cl.[4] .......................................... B60T 11/32
[52] U.S. Cl. ........................................... 303/9; 303/40
[58] Field of Search ................. 303/6.01, 7, 9, 9.76, 303/84.2, 85

[56] References Cited

U.S. PATENT DOCUMENTS

| Re. 30,205 | 2/1980 | Carton et al. | 303/7 |
|---|---|---|---|
| 3,922,064 | 11/1976 | Carton et al. | 303/7 |
| 4,042,281 | 8/1977 | Ury | 303/29 |
| 4,080,004 | 3/1978 | Ury | 303/9 |
| 4,163,585 | 8/1979 | Ury | 303/9 |
| 4,182,535 | 1/1980 | Fannin | 303/9 |

Primary Examiner—Duane A. Reger
Attorney, Agent, or Firm—Neuman, Williams, Anderson & Olson

[57] ABSTRACT

The compact, integrated, multi-function valve employed in semi-trailer brake systems having a plurality of pressurized air reservoirs comprise a plurality of internal passageways and ports communicating externally, a plurality of internal control means for interrupting or establishing fluid communication between the various internal passageways and a plurality of one-way means to ensure the integrity of the brake system in the event of leakage problems with one or the other of the pressurized air reservoirs. A preferred embodiment of the brake valve employs four sets of internal passageways and ports, two control means and two multi-function one-way means. As compared with the prior art, the improved brake valve protects the integrity of the brake system with less complexity, fewer components and the potential for enhanced reliability, reduced maintenance and overall lower costs.

8 Claims, 6 Drawing Sheets

COMPACT, INTEGRATED, MULTI-FUNCTION BRAKE VALVE

BACKGROUND OF THE INVENTION

This invention relates to the subject matter of Disclosure Document No. 214,012, filed Nov. 9, 1988, which is incorporated herein by reference.

1. Field of the Invention

This invention relates to an improved multi-function brake valve for use in fluid pressure braking systems primarily employed on heavy-duty highway vehicles. More specifically, it relates to a compact, integrated, multi-function valve advantageously employed in semi-trailer brake systems which copes with the operating and safety requirements of modern towed vehicles with less complexity and fewer components and the potential for enhanced reliability, reduced maintenance and overall lower cost.

2. Discussion of the Prior Art

Modern heavy-duty braking systems for towed vehicles, particularly those encountered in tractor-trailer truck combinations, include systems having pressurized fluid storage reservoirs and a plurality of valves for controlling the application of the pressurized fluid. Representative prior-art systems are disclosed, for example, in Carton et al U.S. Pat. No. 3,992,064, issued Nov. 16, 1979, entitled "Vehicle Brake System" (reissued on Feb. 5, 1980 as Re. 30,205) and Fannin U.S. Pat. No. 4,182,535, issued Jan. 8, 1980, entitled "Trailer Brake System".

These prior art systems feature dual reservoirs and related piping and valving systems which control communication of fluid pressure to the reservoirs and communication of the pressurized fluid from either of the reservoirs to the spring-actuated, fluid-pressure-released parking brakes. The systems are designed so that the integrity of the service and parking brakes are not totally compromised by limited system failures, as described in considerable detail in these typical prior art references and as more fully set forth hereinafter. To achieve such objective, the prior art systems rely upon a multiplicity of non-integrated components including a plurality of separate check valves or equivalent which are characterized by complexity, substantial space requirements, higher component costs, greater installation maintenance charges and attendant problems.

The improved multi-function valve of the present invention lends itself to the same types of braking systems as employed in the prior art and accomplishes substantially the same functions with enhanced performance. As will be apparent from the description herein, the valve of the present invention also results in less complexity, fewer components and attendant space saving. This simplification provides the potential for enhanced reliability, reduced investment, and lower installation and maintenance costs.

In general, the functions which the improved valve of the present convention carries out include the following:

(a) It communicates the pressurized fluid from a source thereof to the dual reservoirs of the system.

(b) It provides communication of fluid pressure from the source thereof and/or from the dual reservoirs for applying and releasing the parking brakes.

(c) It protects each reservoir against loss of fluid pressure due to failure or leakage in the system between each reservoir and its source of fluid pressure.

(d) It provides communication of fluid pressure from each reservoir independently of the other reservoir to the parking brake actuators so as to release the fluid-pressure-released parking brakes.

In accomplishing these functions using pressurized air as the fluid medium for such purposes, the multi-function valve of the present invention meets all the requirements of the pertinent portions of Federal Regulation FMVSS 121.

OBJECTS OF THE INVENTION

It is therefore a general object of the invention to provide an improved multi-function brake valve for heavy-duty highway vehicles which carries out the aforementioned functions.

It is another general object to provide a compact, integrated, multi-function brake valve which copes with the operating and safety requirements of modern-towed vehicles.

It is another general object to provide a compact, integrated, multi-function brake valve for heavy-duty vehicles which is capable of meeting the requirements of pertinent federal regulations.

It is a specific object of the present invention to provide a multi-function brake valve which integrates various components into a single compact unit.

It is another specific object to provide a compact, integrated, multi-function brake valve which results in space saving.

It is another specific object to provide a compact, integrated, multi-function brake valve which copes with the operating and safety requirements of modern-towed vehicles with less complexity, fewer components and overall lower costs.

It is still another specific object to provide a compact, integrated, multi-function brake valve which protects the integrity of the service and parking brake functions despite limited system failures.

These and other objects of the present invention will become apparent from the description hereinafter set forth.

SUMMARY OF THE INVENTION

These objects are achieved by a compact, integrated, multi-function brake valve which controls communication of a fluid under pressure between a source thereof, a plurality of reservoirs for storage thereof, and a plurality of fluid-pressure-released parking brakes. The unitary valve comprises a valve body having first internal passageway and port for connection to the source of fluid under pressure, a plurality of second internal passageways and ports for connection respectively to each of the plurality of reservoirs, a plurality of third internal passageways and ports for connection respectively to each of the plurality of fluid-pressure-released parking brakes, and a fourth internal passageway and port which exhausts to the atmosphere and which is in fluid communication with the third internal passageways and ports when the fluid pressure in the first internal passageway and port is below a first predetermined level.

The unitary valve also comprises first and second internal control means within the valve body. The first internal control means interrupts fluid communication between the plurality of third internal passageways and ports and the fourth internal passageway and port and establishes fluid communication between the plurality of third internal passageways and ports and the plurality of second internal passageways and ports responsive to a fluid pressure at or above the first predetermined level in the first internal passageway and port. The second internal control means establishes fluid communication between the first internal passageway and port and the plurality of second internal passageways and ports responsive to a fluid pressure in the first internal passageway and port at or above a second predetermined level which is higher than the first predetermined level.

The unitary valve of the present invention also comprises first and second one-way means within the valve body. The first one-way means is within the passageways of the plurality of second internal passageways and ports and individually isolates at least portions of each of the plurality of second passageways and ports and the corresponding reservoir from the first passageway and port responsive to a lower fluid pressure in the first internal passageway and port as compared with the fluid pressure in the respective portions of each of the plurality of second internal passageways and ports. The second one-way means is also within the passageways of the plurality of second internal passageways and ports for isolating each of the plurality of second internal passageways and ports from each other responsive to a pressure differential between the respective passageways and ports of the plurality of second internal passageways and ports.

As will be apparent from the detailed description, the unitary valve having the aforesaid components is designed so that each of the plurality of reservoirs and communicating internal passageways and ports is protected against substantial loss of fluid pressure in the event of failure or leakage of fluid pressure from the source thereof and the communicating first internal passageway and port, or from the others of the plurality of reservoirs and internal passageways and ports. This assures that the protected reservoir is available to supply fluid under pressure to the plurality of fluid-pressure-released parking brakes as well as to the service brakes.

The first internal control means referred to above may comprise a plunger having both spring-biased and pressure-biased opposed positions. The plunger has a surface adjacent one extremity exposed and movably responsive to pressure of the fluid in the first passageway and port, so as to counter the bias of the spring. At the other extremity there are means disposed between opposed registering seating surfaces whereby in the spring-biased position of the plunger, the plurality of third passageways and ports are in fluid communication only with the fourth internal passageways and ports, and in the pressure-biased position the plurality of third passageways and ports are in fluid communication only with the plurality of second passageways and ports.

The operation of the first internal control means described in the previous paragraph may be enhanced by a dual surface configuration. In this embodiment initial movement of the plunger from the spring biased position responsive to fluid pressure on the surface adjacent the extremity which is exposed to pressure of the fluid in the first passageways and port exposes still further surface area, preferably concentric and axially aligned and preferably annular, to the fluid pressure. This magnifies the force on the plunger and accelerates movements to the pressure-biased position whereby a snap-action operation is achieved.

The brake valve of the present invention is further characterized in that the first one-way means may comprise an integrally-formed resilient body, preferably rubber or rubber-like, having a plurality of one-way flapper appendages permitting fluid flow in each of the passageways of said plurality of second internal passageways and ports towards the corresponding reservoirs and blocking said fluid flow in the opposite direction.

The brake valve of the present invention is further characterized in that the second one-way means may comprise a resilient means, typically a rubber or rubber-like disk, intermediate each of the plurality of second internal passageways and ports so as to control fluid communication therefrom to a common passageway to the plurality of third internal passageways and ports, the resilient disk being responsive to a fluid pressure differential between each of the second internal passageways and ports so as to isolate the passageway having a lower fluid pressure from fluid communication with the common passageway.

The brake valve of the present invention is also characterized in that the second internal control means may comprise means for interrupting fluid communication between the first internal passageway and port and the plurality of second internal passageways and ports at or above the second predetermined fluid pressure level whenever a predetermined pressure differential exists between the first internal passageway and port and the plurality of second internal passageways and ports.

Because most modern-day systems employ pressurized air as the fluid medium for actuation and control purposes and such use is contemplated in the best-mode embodiment described herein, the detailed description herein set forth assumes such medium to be used. As those skilled in the art will recognize, however, the invention is not necessarily limited thereto.

BRIEF DESCRIPTION OF THE DRAWINGS

The present invention may be more clearly understood from the following detailed description of a specific and preferred embodiment read in conjunction with the accompanying drawings, wherein.

It should be understood that the drawings are not necessarily to exact scale and that certain aspects of the embodiments are illustrated by graphic symbols, schematic representations and fragmentary views. It should also be understood that when referring to physical relationships of components by terms such as "upper", "lower", "upward", "downward", "vertical", "horizontal", "left", "right" or the like, such terms have reference solely to the orientation depicted in the drawings. Actual embodiments or installations thereof may differ. It should also be understood that the term "passageway" is not necessarily limited to a tubular path but may encompass communicating spaces, chambers and the like.

While much mechanical detail, including other plan and section views of the particular embodiment depicted have been omitted, such detail is not per se part of the present invention and is considered well within the comprehension of those skilled in the brake arts in the light of the present disclosure. The resulting simplified presentation is believed to be more readable and informative and readily understandable by those skilled in the art. It should also be understand, of course, that the invention is not limited to the particular embodiment illustrated.

DETAILED DESCRIPTION OF DRAWINGS

The Overall Brake System

Figure 1:
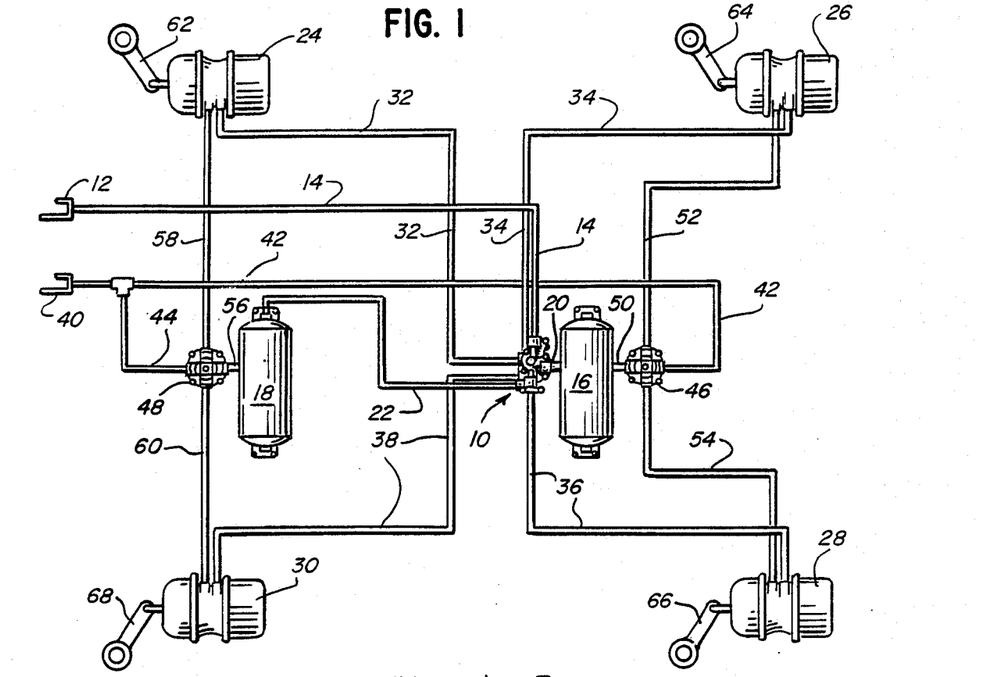
FIG. 1 is an overall schematic of a semi-trailer brake system wherein the compact, integrated, multi-function brake valve of the present invention is advantageously employed.

Referring to FIG. 1, the schematic represents a semi-trailer brake system wherein the compact, integrated, multi-function brake valve 10 of the present invention is advantageously employed. Compressed supply or emergency air, typically at about 125 psig, is received into the system from a supply source located in the tractor (not shown) of a well-known tractor-trailer combination via trailer gladhand connector 12 and is communicated to brake valve 10 via line 14. As will be described in detail, the compressed air is directed by valve 10 to service and parking brake compressed air reservoirs 16 and 18 via connectors or lines 20 and 22, respectively. Compressed air is also directed by valve 10 to the parking brake chambers of conventional brake actuators 24, 26, 28 and 30 via air lines 32, 34, 36 and 38, respectively.

Initially, upon charging of the system, the spring or parking brake chambers of the brake actuators receive compressed air, as do the reservoirs, through valve 10 directly from the source, i.e., through line 14. Upon being fully charged, the spring or parking brake chambers thereafter may be in fluid communication with one or both reservoirs, as well as the source, as will become apparent as the description proceeds. Reservoirs 16 and 18 are each sized to have sufficient capacity to meet the requirements of federal regulations. Thus, for example, the reservoirs in a particular system may each have a capacity of at least 1500 cubic inches of compressed (125 psig) air, which is more than sufficient to meet the requirement of adequate capacity in each reservoir to release the parking brakes at least once.

Control or service air from the tractor is received via trailer gladhand connector 40 and is communicated via control lines 42 and 44 to control relay valves 46 and 48, respectively, which may be of conventional design. Pressurized air from reservoir 16 is delivered on demand, as determined by control air, via line 50, relay valve 46 and lines 52 and 54 to the service brake chambers of brake actuators 26 and 28, respectively. Similarly, pressurized air from reservoir 18 is supplied on demand, as determined by control air, via line 56, relay valve 48 and lines 58 and 60 to the service brake chambers of brake actuators 24 and 30, respectively.

Brake actuators 24, 26, 28 and 30 apply and release the emergency and service brakes via slack adjustors 62, 64, 66 and 68, respectively, in a conventional manner familiar to those skilled in the art. Since brake valve 10 of the present invention functions primarily in connection with operation of the parking or emergency spring brakes, the balance of the description will be limited primarily to its function in that connection. Reference to FIG. 1, however, will make it apparent how the valve otherwise carries out its function, particularly with respect to protection of the system in the event of leakage from one or the other of reservoirs 16 and 18 or from the lines or passageways in fluid communication therewith.

Overall Description of Valve 10

Figures 2, 4:
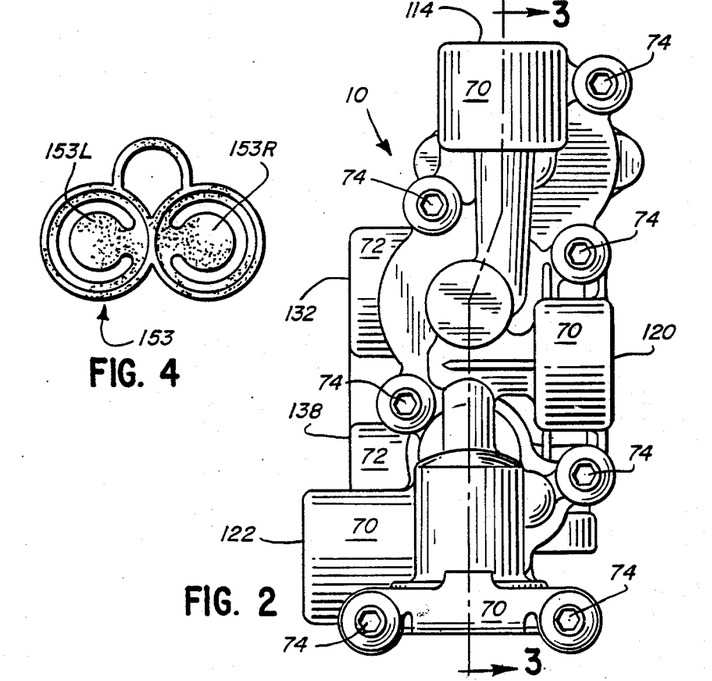
FIG. 2 is an overhead plan view of a particular embodiment of the brake valve of the present invention which may be employed in the brake system schematically depicted in FIG. 1.
FIG. 4 is a plan view of the dual one-way flapper valve (the first one-way means) which is shown in section in FIGS. 3 and 7-10.
Figure 3:
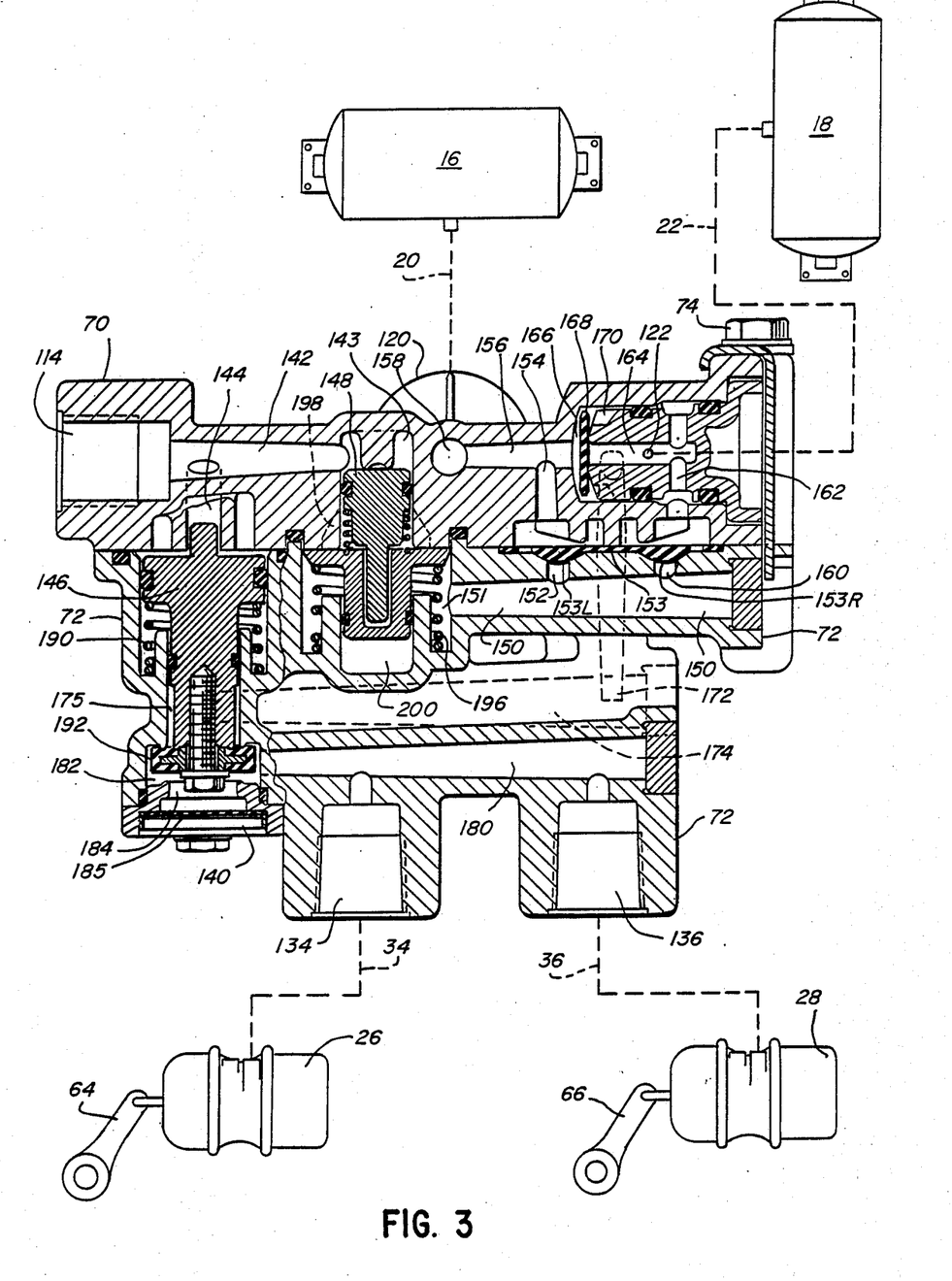
FIG. 3 is a sectional view of the brake valve of FIG. 2 on a slightly-enlarged scale and taken along the line 3—3 of FIG. 2 with certain reservoirs and parking brake actuators schematically depicted for purposes of illustration, the movable internals of the valve being shown in the positions assumed when the trailer supply line is not charged with pressurized air.

Referring to FIGS. 2 and 3, valve 10 of the present invention comprises upper body portion 70 and lower body portion 72 which are mechanically sealed together into a single unit by a series of conventional fasteners 74 with compressible O-rings or the like, as indicated. The two body portions are readily molded from, for example, a suitable grade of nylon plastic, rendering it both lightweight and non-corrosive. The movable internal components which are not part of the molded upper and lower portions are readily assembled within the valve prior to fastening the upper and lower body portions 70 and 72 together and otherwise completing the valve assembly.

The external ports depicted in FIGS. 2, 3 and 7-10 have the same reference numerals, plus 100 as the compressed air lines depicted in FIG. 1. Accordingly, the schematic system shown in FIG. 1 can be directly related to the valve of the present invention depicted in the other figures by correlating reference numbers. Thus, for example, line 14 supplies compressed air to port 114 of valve 10.

Referring to FIG. 3, which depicts the valve internals prior to charging with pressurized supply or emergency air via port 114, the embodiment of the present invention which is depicted comprises four sets of internal passageways and ports. These sets of internal passageways and ports are isolated from, or in communication with, each other, depending upon the position of various internal control means and one-way means, to be described hereinafter. At the outset, however, the four sets of passageways and ports will be briefly described without detailed reference to the control means and one-way means.

As will be apparent from the following description and in the light of FIGS. 1 and 2, the first set of passageways and ports is in fluid communication via port 114 with a source of compressed air. The second set is in fluid communication via ports 120 and 122 with reservoirs 16 and 18. The third set is in fluid communication via ports 132, 134, 136 and 138 with brake actuators 24, 26, 28 and 30. The fourth set is in fluid communication via exhaust port 140 with the atmosphere.

It should be noted that ports 134, 136 and 140 are hidden in the view of FIG. 2 but are shown in section in FIGS. 3 and 7–10. In the section view of FIGS. 3 and 7–10, ports 122, 132 and 138 are not depicted because of the positioning of the section line, but are shown in FIG. 2. In FIGS. 3 and 7–10, port 122, which is in fluid communication with passageway 164, is symbolically shown by a small circle to assist in understanding the structure. Its actual size and location is shown in FIG. 2. For all purposes herein, it can be assumed that ports 132 and 138 are in constant fluid communication with ports 134 and 136 via a common passageway.

DETAILED DESCRIPTION OF PASSAGEWAYS AND PORTS

Referring to FIGS. 3 and 7–10, the first set of internal passageways and ports comprise port 114, horizontal passageway 142, including chamber 143, and communicating vertical passageway 144. Passageway 144 is in fluid communication with the upper exposed surface of a first control means 146 the operation of which will be described further hereinafter. Passageway 142 is in fluid communication with the upper exposed surfaces of second control means 148, the operation of which will also be hereinafter described. Second control means 148 has upper and lower telescopic sections, each independently spring biased in an upward direction.

The second set of internal passageways and ports comprise horizontal passageway 150, which communicates with chamber 151, and communicating passageways leading, respectively, to ports 120 and 122, which in turn are in fluid communication with reservoirs 16 and 18, via lines 20 and 22, respectively. The passageways leading from passageway 150 to port 120, include vertical passageway 152 and, upon opening of the left flapper 153L of flapper valve 153, verticle passageway 154 and horizontal passageways 156 and 158, the latter leading to port 120. The passageways leading from passageway 150 to port 122 include vertical passageway 160 and, upon opening of the right flapper 153R of flapper valve 153, vertical annular passageway 162 and horizontal passageway 164, the latter being in fluid communication with port 122, shown symbolically.

As shown in FIG. 4, flapper valve 153 with left and right flappers 153L and 153R is an inexpensive unitary resilient rubber or rubber-like structure which effectively and reliably performs multiple functions. Its simplicity and ease of installation and replacement contrasts with more complex and costly alternatives employed for similar purposes in the prior art.

Figure 5:
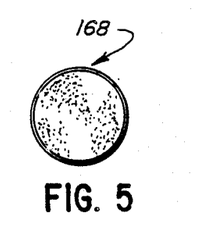
FIG. 5 is a plan view of the dual-purpose diaphragm or disc of the dual one-way valve (the second one-way means) which is shown in section in FIGS. 3 and 7-10.
Figure 7:
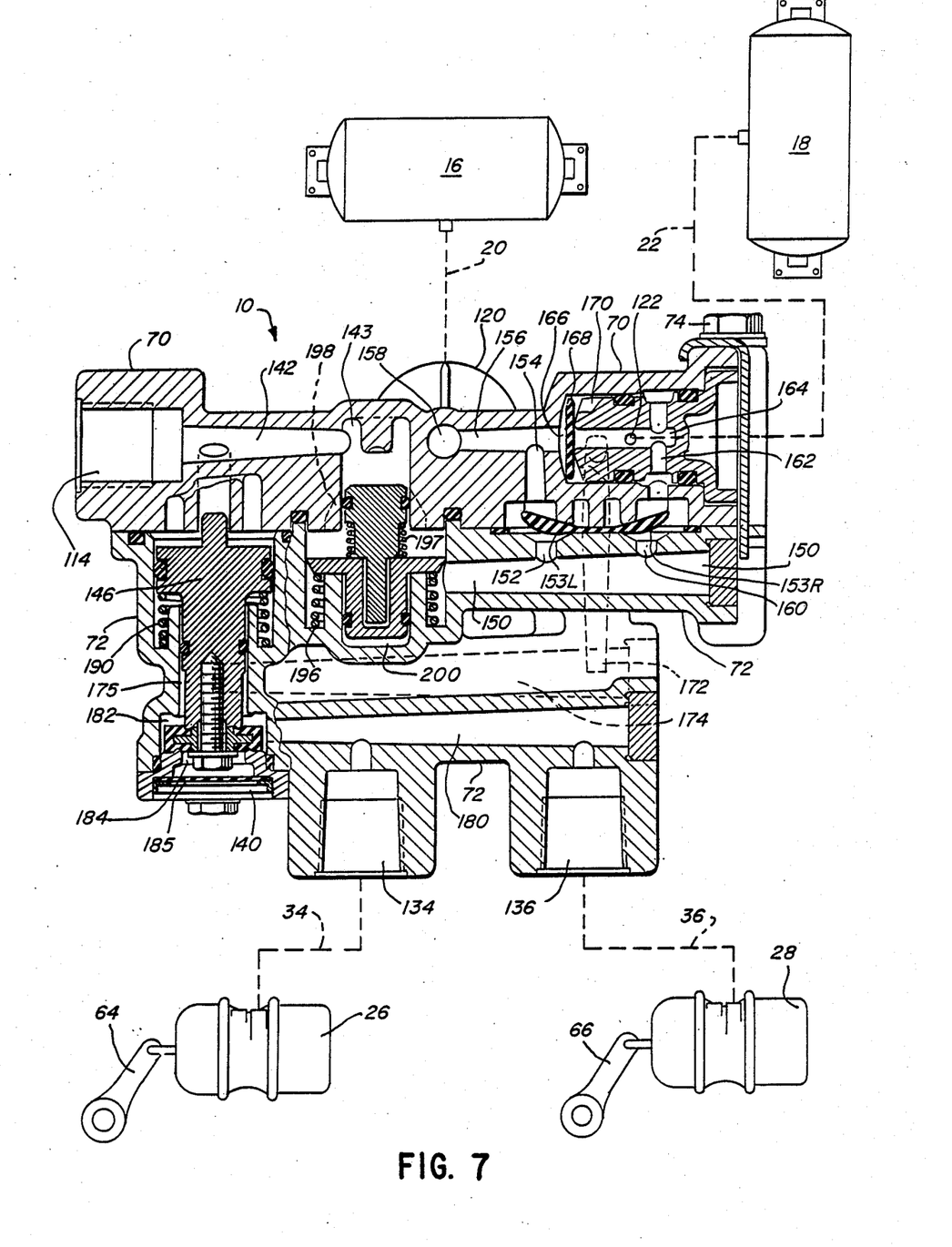
FIG. 7 is view similar to FIG. 3 depicting the positions of the movable internals of the valve as the semi-trailer brake system is being initially charged with pressurized air from the trailer supply line.
Figure 8:
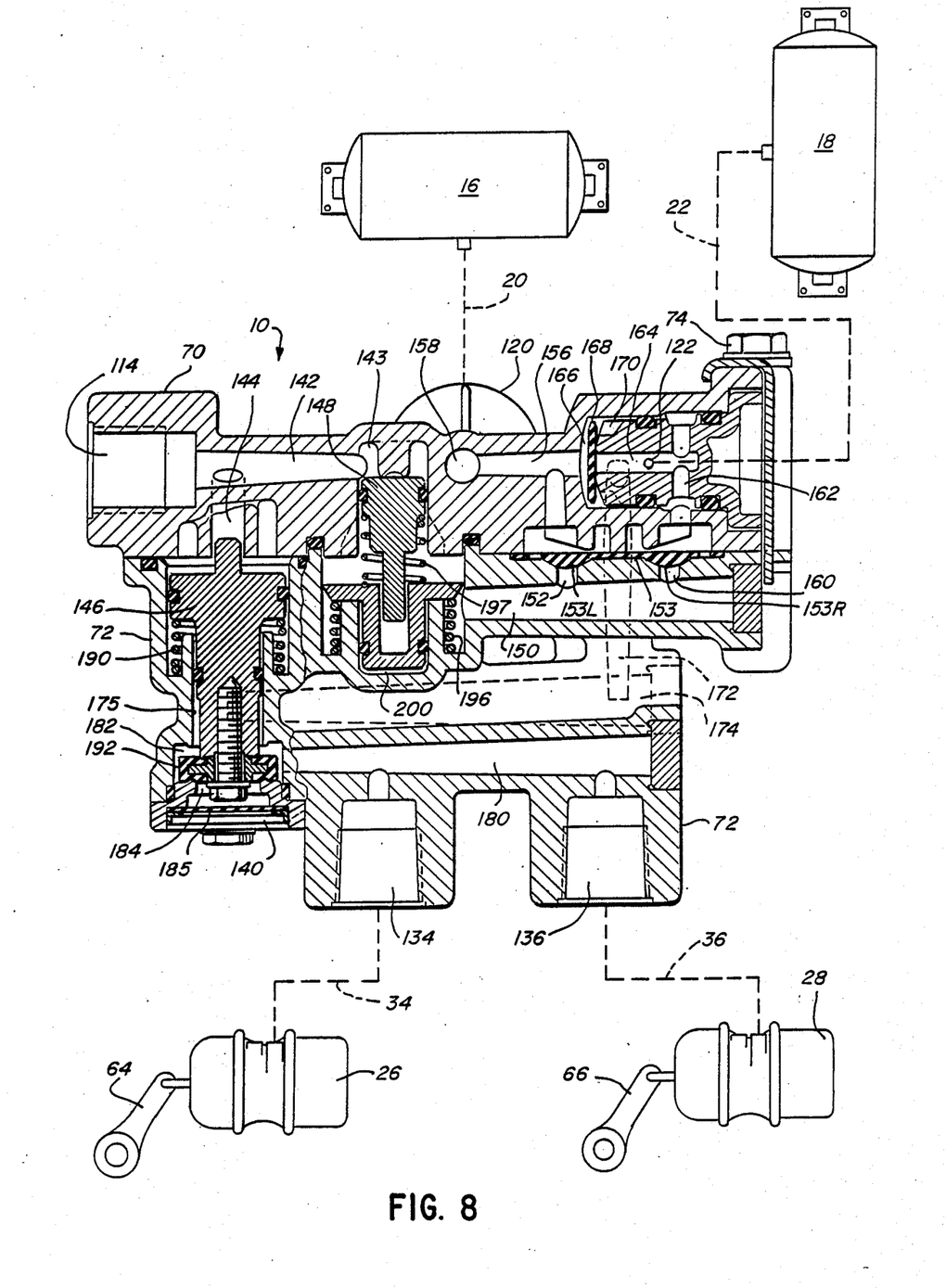
FIG. 8 is a view similar to FIG. 3 depicting the positions of the movable internals of the valve after the system is fully charged.

Horizontal passageways 156 and 164 are in interruptable fluid communication by commonly-shared passageway or space 166 having resilient sealing diaphragm or disk 168 movably disposed therein, the latter effecting the sealing of the right end of passageway 156 or the left end of passageway 164 in the event of a pressure differential in these passageways relative to each other, as will be apparent from a consideration of FIGS. 9 and 10 to be discussed hereinafter. Although diaphragm is shown in FIGS. 3, 7 and 8 in apparent contact with the left end of passageway 164, such contact is loose and does not result in a sealing engagement absent a pressure differential. As shown in FIG. 5, disk 168 is simply a circular resilient rubber or rubber-like diaphragm capable of selectively sealing dual passageways when under the influence of a pressure differential. Its simplicity contrasts with more complex alternatives used in the prior art.

Absent a pressure differential in passageways 156 and 164 whereby disk 168 is not in sealing engagement with either passageway, both passageways 156 and 164 are in fluid communication with communicating passageways 170, vertical passageway 172 (dashed lines) and horizontal passageway 174 (dashed lines). The left end of horizontal passage 174 is in fluid communication with annular passageway or space 175.

The third set of internal passageways and ports include horizontal passageway 180 and communicating passageway or chamber 182. Passageway 180 is in continuous fluid communication with ports 132, 134, 136 and 138 and the respective parking brake chambers of the brake actuators.

Figure 6:
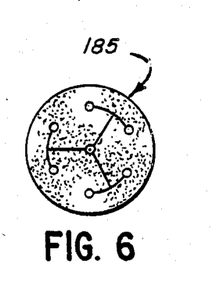
FIG. 6 is a plan view of the exhaust diaphragm employed in the fourth internal passageway and port, which is shown in section in FIGS. 3 and 7-10.

The fourth internal passageway and port comprises passageway 184 which is in fluid communication through resilient exhaust diaphragm 185 with port 140. As shown in FIG. 6, diaphragm 185 comprises a rubber or rubber-like circular diaphragm which has a series of equally-spaced holes or apertures towards the outer periphery and slices or cuts therein as shown to facilitate the exhaustion of air steadily or even in bursts. Port 140 is, of course, open to the atmosphere.

DESCRIPTION OF CONTROL MEANS

As above indicated, in the uncharged condition depicted in FIG. 3, and with the first internal control means 146 biased in its upper position by spring 190, the third internal passageways and ports, including ports 132, 134, 136 and 138 are in fluid communication with the fourth internal passageways and ports including port 140, which exhausts to the atmosphere. Fluid communication between the third and fourth internal passageways and ports is interrupted, and fluid communication between the third and second internal passageways and ports established, by the downward movement of control means 146 against the bias of spring 190 whereby the upper sealing surface of resilient annular ring 192 is no longer seated and the opposed lower sealing surface of annular sealing ring 192 becomes seated in sealing engagement. This downward disposition of control means 146 is depicted in FIGS. 7–10.

Fluid communication between the first internal passageways and ports including port 114 and the second internal passageways and ports including ports 120 and 122 is established by a downward movement of the upper and lower telescopic sections of second control means 148 against the bias of spring 196, whereby fluid communication between chambers 143 and 151 is established via passageway 198 (dashed lines). It should be noted in connection with the downward movement of second control means 148 that void space 200 is in communication with the atmosphere whereby downward movement of second control means 148 does not cause compression of the air in void space 200.

As previously indicated, fluid communication between vertical passageways 152 and 154 and vertical passageways 160 and 162 is facilitated by the opening of flappers 153L and 153R of flapper valve 153 whenever the upper passageways are at a lower pressure than the lower passageways. Manifestly, an opposite pressure differential will seal the vertical passageways from each other.

Also as previously indicated, diaphragm disc 168 will react to a pressure differential between passageways 156 and 164 to isolate the passageway having the lower pressure from the other passageway and spaces 166 and 170 and communicating passageways. This will become apparent in the subsequent description, particularly in connection with FIGS. 9 and 10.

Mode of Operation

In the uncharged condition depicted in FIG. 3, the parking brake chambers of actuators 24, 26, 28 and 30 which are connected to ports 132, 134, 136 and 138, are exhausted to atmospheric pressure via port 140. In this condition the spring brakes of the semi-trailer are applied for emergency or parking purposes.

When the truck tractor and its air hoses and electrical connections are attached to the semi-trailer, the driver actuates the necessary controls to charge the trailer supply line 14, whereby pressure builds up in port 114 and passageways 142, 143 and 144. As the pressure initially reaches about 20 to 25 psig, the force created by the pressure acting on the upper surface of control means 146 is sufficient to overcome the bias of spring 190 whereby the lower sealing surface of annular sealing ring 192 isolates space 182 from port 140 and connects 182 to space 175, passageway 174 and communicating passageways. In this condition, the parking brake chambers of actuators 24, 26, 28 and 30 are no longer exhausted to atmospheric pressure.

As the pressure continues to build in passageway 142 and 143, it will become sufficient at about 45 to 55 psig to create sufficient force on the upper surface of the upper section of the second control means 148 to overcome the bias of spring 196, resulting in downward movement. In the lowered position of control means 148 depicted in FIG. 7, pressurized air passes via passageways 142, 143, 198 and 151 to passageway 150, whereby both the reservoirs 16 and 18 and brake chambers of actuators 24, 26, 28 and 30 are charged with compressed air.

Specifically, pressurized air from passageways 142, 143, 198, 151 and 150 passes via vertical passageway 152, upraised flapper 153L, passageway 154, 156, 158, port 120 and line 20 to reservoir 16. Similarly, pressurized air from passageway 150 passes via passageways 160, upraised flapper 153R and passageways 162 and 164 to port 122, whence it charges reservoir 18 via line 22. The substantially-equal pressure existing in passageways 156 and 164 on each side of diaphragm 168 in space 166 permits pressurized air from either side to enter space or passageway 170 and thence via passageways 172, 174, 175, 182 and 180 to ports 132, 134, 136 and 138 for charging the parking brake chambers of the brake actuators.

Reservoirs 16 and 18 and the parking brake chambers of actuators 24, 26, 28 and 30 rapidly fill to system pressure, e.g., about 125 psig. The position of the movable internals of valve 10 at full system pressure is illustrated in FIG. 8. At this point the upper section of telescoping control means 148, which is subject to the bias of spring 197, returns to its upper equilibrium position where it acts as a backup check valve for dual flapper valve 153. This provides backup protection against leakage in the system between the reservoirs and the source of air pressure, i.e., gladhand 12 and line 14.

Protection in the Event of Leakage

Figure 9:
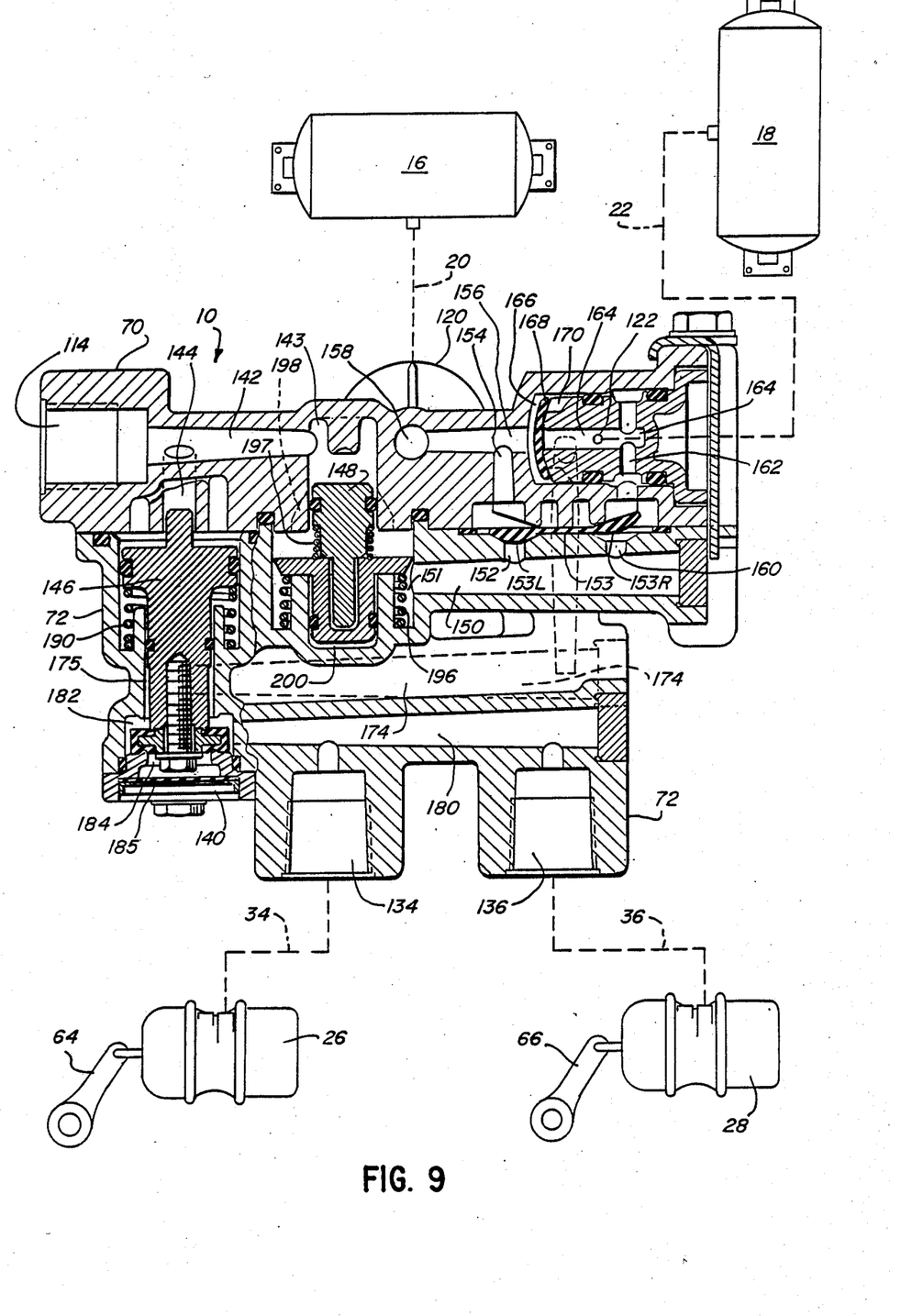
FIG. 9 is a view similar to FIG. 3 depicting the position of the movable internals of the valve when one of the compressed air reservoirs of the semi-trailer brake system has failed.
Figure 10:
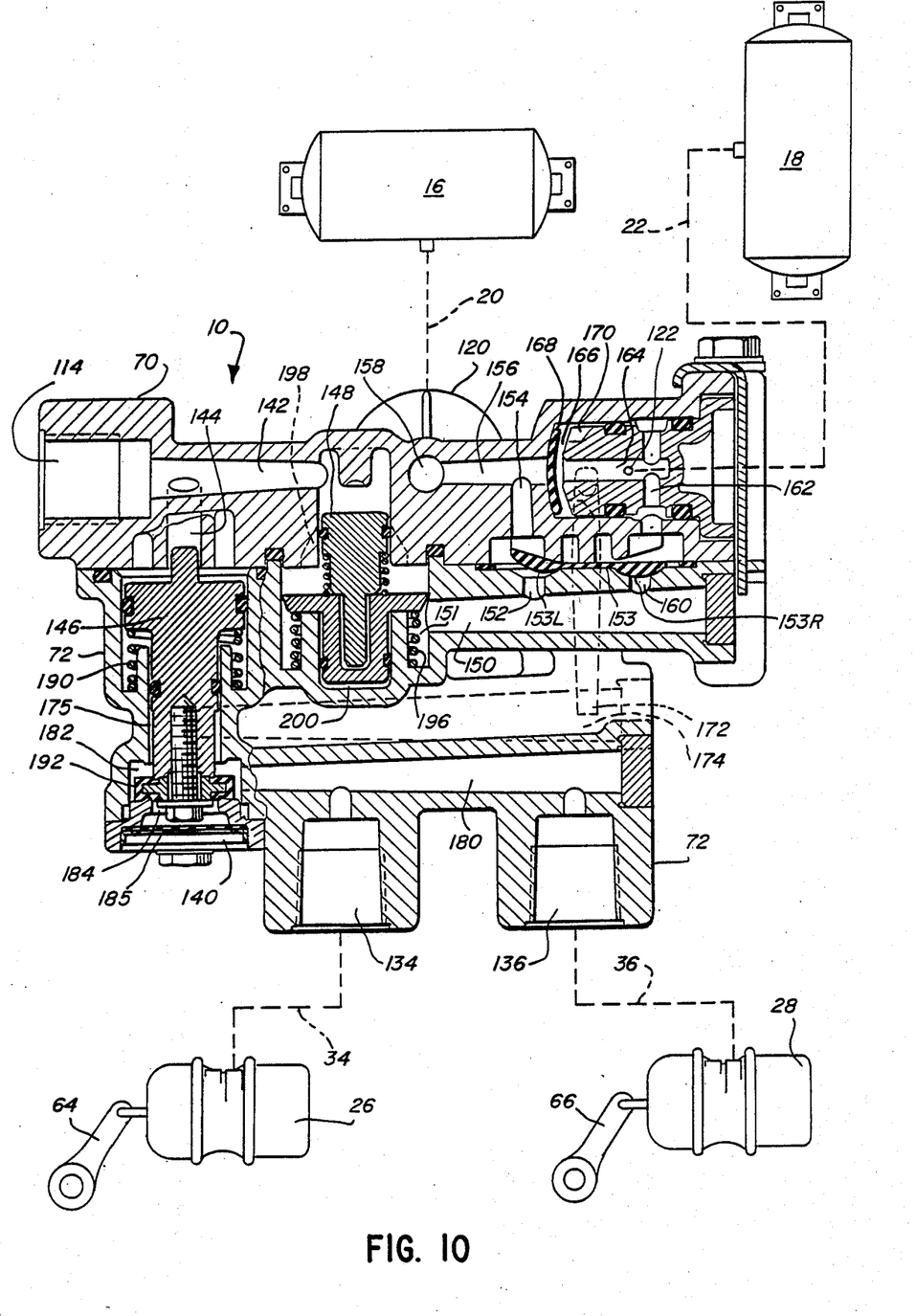
FIG. 10 is a view similar to FIG. 3 depicting the position of the movable internals of the valve in the position when the other of the compressed air reservoirs has failed.

How the valve of the present invention operates to protect the system in the event of leakage in either of the reservoirs and their connecting lines is best illustrated in FIGS. 9 and 10. FIG. 9 illustrates the situation when, for example, leakage occurs in reservoir 18. FIG. 10 illustrates the situation when leakage occurs in reservoir 16.

Referring to FIG. 9, the drop in pressure caused by leakage in reservoir 18 or its associated lines, results in a pressure differential between passageway 164 and 156. As a result, diaphragm disc 168 assumes the sealing position shown, isolating the two passageways from each other and preventing any substantial drop in pressure in passageway 156, 158, port 120, line 20 and reservoir 16. The pressurized air in reservoir 16 is still available via space 166, passageways 170, 172, 174, spaces 175 and 182 and passageway 180 to ports 132, 134, 136 and 138 whereby the spring brakes of actuators 24, 26, 28 and 30 remain in the released position.

Likewise, with reference to FIG. 10, should a leak occur in reservoir 16 or associated passageways, the resulting drop in pressure in passageway 156 causes diaphragm disc 168 to isolate passageway 156 from passageway 164 and space 166 whereby pressurized air from reservoir 18 is available via its associated passageways to space 170 and the intermediate passageways to ports 132, 134, 136 and 138 Whereby the spring brakes of brake actuators 24, 26, 28 and 30 remain in the released position.

As it is apparent from the above description, valve 10 copes with the operating and safety requirements of modern towed semi-trailers. It meets the requirements of pertinent federal regulations and does so by integrating various components into a single, space-saving unit. It features fewer components, greater simplicity and lower maintenance. It achieves the objects of the present invention as previously set forth.

It is to be understood that any allowed claims based on this application are to be accorded a range of equivalents commensurate in scope with the advance made over the prior art.

Having described the invention, what is claimed is:

1. A compact, integrated, multi-function brake valve for controlling communication of a fluid under pressure between a source thereof, a plurality of reservoirs for storage thereof, and a plurality of fluid-pressure-released parking brakes, said valve comprising:
   (a) first internal passageways and port for connection to said source of fluid under pressure;
   (b) a plurality of second internal passageways and ports for connection respectively to each of said plurality of reservoirs for storage of fluid under pressure;
   (c) a plurality of third internal passageways and ports for connection respectively to each of said plurality of fluid-pressure-released parking brakes;
   (d) a fourth internal passageway and port exhausting to the atmosphere and in fluid communication with said third internal passageways and ports when the fluid pressure in said first internal passageway and port is below a first predetermined level;
   (e) a first internal control means within said valve for interrupting fluid communication between said plurality of third internal passageways and ports and said fourth internal passageway and port, and for establishing fluid communication between said plurality of third internal passageways and ports and said plurality of second internal passageways and ports responsive to a fluid pressure at or above said first predetermined level in said first internal passageway and port;

(f) second internal control means within said valve for establishing fluid communication between said first internal passageways and port and said plurality of second internal passageways and ports responsive to a fluid pressure in said first internal passageway and port at or above a second predetermined level which is higher than said first predetermined level;

(g) first one-way means within the passageways of said plurality of second internal passageways and ports for individually isolating at least portions of each of said plurality of second passageways and ports and the corresponding reservoir from said first internal passageway and port responsive to a lower fluid pressure in said first internal passageways and port as compared with the fluid pressure in the respective portions of each of said plurality of second passageways and ports; and (h) second one-way means within the passageways of said plurality of second internal passageways and ports for isolating each of said plurality of second internal passageways and ports from each other responsive to a pressure differential between the respective passageways and ports of said plurality of second internal passageways and ports;

so that each of said plurality of reservoirs and communicating internal passageways and ports is protected against substantial loss of fluid pressure in the event of failure or leakage of fluid pressure from said source thereof and the communicating first internal passageways and ports, or from the others of said plurality of reservoirs and internal passageways and ports; whereby the protected reservoir is available to supply fluid under pressure to the plurality of fluid-pressure-released parking brakes.

2. The brake valve of claim 1 wherein said first internal control means comprises a plunger having both spring-biased and pressure-biased opposed positions, said plunger having a surface adjacent one extremity exposed and movably responsive to pressure of the fluid in said first passageways and port, so as to counter the bias of the spring, and at the other extremity means disposed between opposed registering seating surfaces whereby in the spring-biased position of said plunger said plurality of third passageways and ports are in fluid communication only with said fourth internal passageway and port, and in the pressure-biased position said plurality of third passageways and ports are in fluid communication only with said plurality of second passageways and ports.

3. The brake valve of claim 1, wherein said second internal control means, includes means for interrupting fluid communication between said first internal passageways and ports and said plurality of second internal passageways and ports at or above said second predetermined fluid pressure level whenever a predetermined pressure differential exists between said first internal passageways and ports and said plurality of second internal passageways and ports.

4. The brake valve of claims 1, 2 or 3 wherein said first one-way means comprises an integrally-formed resilient body having a plurality of one-way flapper appendages permitting fluid flow in each of the passageways of said plurality of second internal passageways and ports towards the corresponding reservoirs and blocking such fluid flow in the opposite direction.

5. The brake valve of claims 1, 2 or 3 wherein said second one-way means comprises a resilient disc intermediate each of said plurality of second internal passageways and ports so as to control fluid communication therefrom to a common passageway to said plurality of third internal passageways and ports, said resilient disc being responsive to a fluid pressure differential between each of said second internal passageways and ports so as to isolate the passageway having a lower fluid pressure from fluid communication with said common passageway.

6. A compact, integrated, multi-function brake valve for controlling communication of a fluid under pressure between a source thereof, a plurality of reservoirs for storage thereof, and a plurality of fluid-pressure-released parking brakes, said valve comprising:

(a) first internal passageways and port for connection to said source of fluid under pressure;

(b) a plurality of second internal passageways and ports for connection respectively to each of said plurality of reservoirs for storage of fluid under pressure;

(c) a plurality of third internal passageways and ports for connection respectively to each of said plurality of fluid-pressure-released parking brakes;

(d) a fourth internal passageway and port exhausting to the atmosphere and in fluid communication with said third internal passageways and ports when the fluid pressure in said first internal passageway and port is below a first predetermined level;

(e) a first internal control means within said valve for interrupting fluid communication between said plurality of third internal passageways and ports and said fourth internal passageway and port, and for establishing fluid communication between said plurality of third internal passageways and ports and said plurality of second internal passageways and ports responsive to a fluid pressure at or above said first predetermined level in said first internal passageway and port;

(f) second internal control means within said valve for establishing fluid communication between said first internal passageways and port and said plurality of second internal passageways and ports responsive to a fluid pressure in said first internal passageway and port at or above a second predetermined level which is higher than said first predetermined level;

(g) first one-way means within the passageways of said plurality of second internal passageways and ports for individually isolating at least portions of each of said plurality of second passageways and ports and the corresponding reservoir from said first passageway and port responsive to a lower fluid pressure in said first internal passageways and port as compared with the fluid pressure in the respective portions of each of said plurality of second passageways and ports, said first one-way means comprising an integrally-formed resilient body having a plurality of one-way flapper appendages permitting fluid flow in each of the passageways of said plurality of second internal passageways and ports towards the corresponding reservoirs and blocking such fluid flow in the opposite direction; and (h) second one-way means within the passageways of said plurality of second internal passageways and ports for isolating each of said plurality of second internal passageways and ports from each other responsive to a pressure differential between the respective passageways and ports of said plurality of second internal passageways and ports, said second one-way means comprising a resilient disc intermediate each of said plurality of second internal passageways and ports so as to control fluid communication therefrom to a common passageway to said plurality of third internal passageways and ports, said resilient disc being responsive to a fluid pressure differential between each of said second internal passageways and ports so as to isolate the passageway having a lower fluid pressure from fluid communication with said common passageway;

so that each of said plurality of reservoirs and communicating internal passageways and ports is protected against substantial loss of fluid pressure in the event of failure or leakage of fluid pressure from said source thereof and the communicating first internal passageways and ports, or from the others of said plurality of reservoirs and internal passageways and ports; whereby the protected reservoir is available to supply fluid under pressure to the plurality of fluid-pressure-released parking brakes.

7. The brake valve of claim 6 wherein said first one-way means comprises an integrally-formed resilient body having a plurality of one-way flapper appendages permitting fluid flow in each of the passageways of said plurality of second internal passageways and ports towards the corresponding reservoirs and blocking such fluid flow in the opposite direction.

8. The brake valve of claims 6 or 7 wherein said second one-way means comprises a resilient disc intermediate each of said plurality of second internal passageways and ports so as to control fluid communication therefrom to a common passageway to said plurality of third internal passageways and ports, said resilient disc being responsive to a fluid pressure differential between each of said second internal passageways and ports so as to isolate the passageway having a lower fluid pressure from fluid communication with said common passageway.

* * * * *